G. KIMBALL.
Horse Rake.
No. 45,502. 
Patented Dec. 20, 1864.
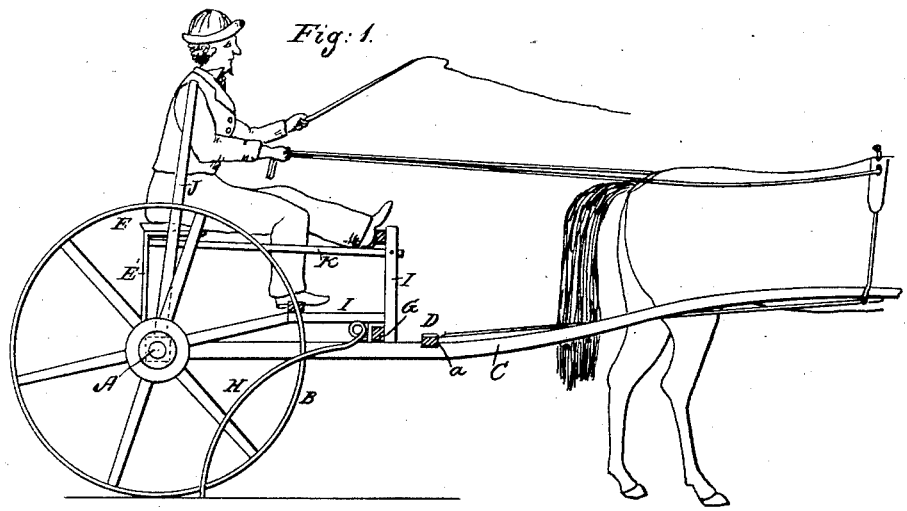
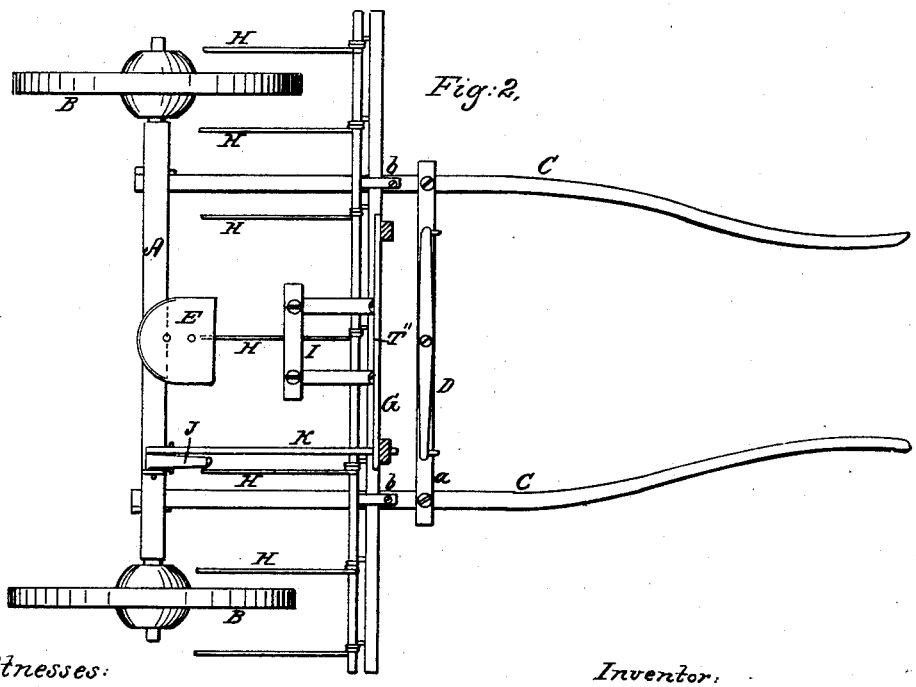

UNITED STATES PATENT OFFICE.

GEORGE KIMBALL, OF SPRINGFIELD, VERMONT.

IMPROVEMENT IN HORSE-RAKES.

Specification forming part of Letters Patent No. 45,502, dated December 20, 1864.

*To all whom it may concern:*

Be it known that I, GEORGE KIMBALL, of Springfield, in the county of Windsor and State of Vermont, have invented a new and Improved Horse-Rake; and I do hereby declare that the following is a full, clear, and exact description thereof, which will enable others skilled in the art to make and use the same, reference being had to the accompanying drawings, forming part of this specification, in which—

Figure 1 is a side view of my invention; Fig. 2, a plan or top view of the same.

Similar letters of reference indicate like parts.

This invention consists in having the rake attached to the thills in front of the wheels, and having hand and foot levers arranged and applied in such a manner that the driver, while on his seat and when the rake is at work, will have perfect control over the latter, so as to keep it in proper working position and allow it to yield or give to conform to the inequalities of surface over which it may pass, and also readily raise it, in order that it may discharge its load.

A represents an axle having a wheel, B, at each end of it; and C C are thills, attached to the axle, and connected by a cross-bar, *a*, to which the whiffletree D is attached.

E is the driver's seat, at the upper end of a standard or support, F, which is secured to the axle; and G is a rake-head fitted in bearings *b b* on the thills C C, in front of the wheels B B, the rake-head being allowed to turn freely in its bearings.

H represents the rake-teeth, which are of the usual curved form, constructed of wire and attached to the rake-head G in the ordinary manner.

To the rake-head G there are secured two lever-frames, I I', which are at right angles to each other, as shown clearly in Fig. 1, the frame I being in a horizontal and the frame I' in a vertical position when the teeth H are at work.

To the axle A the lower end of a lever, J, is attached, and this lever is connected by a rod, K, with the lever-frame I'. The lever J extends upward by the side of the driver's seat E, so as to be within convenient reach of the driver.

As the machine is drawn along the driver has his feet acting upon the frames I I', and the rake is operated or controlled thereby, so as to be kept to its work or raised in order that it may discharge its load. The lever J may also be manipulated at any time in order to assist in the operation.

The device is extremely simple and efficient, there being but few parts, and none which are liable to get out of repair.

I claim as new and desire to secure by Letters Patent—

The two lever-frames I I', attached to the rake-head G, as shown, in combination with the lever J, attached to the axle A and connected to the frame I' by the rod K, when said parts are used with a rake attached to the thills C C in front of the wheels B B, and all arranged to operate substantially as and for the purpose set forth.

GEORGE KIMBALL.

Witnesses:
SAML. W. PORTER,
SAML. STEELE.